(12) United States Patent
Fromreide et al.

(10) Patent No.: US 7,427,313 B2
(45) Date of Patent: Sep. 23, 2008

(54) AIR PURIFICATION DEVICE

(76) Inventors: Hans-Jacob Fromreide, Elisenbergvelen 5, Oslo (NO) N-0265; Tomm Slater, Moreils vei 1 c, Oslo (NO) N-0487

( * ) Notice: Subject to any disclaimer, the term of this patent is extended or adjusted under 35 U.S.C. 154(b) by 405 days.

(21) Appl. No.: 10/495,769

(22) PCT Filed: Jun. 27, 2002

(86) PCT No.: PCT/NO02/00237

§ 371 (c)(1),
(2), (4) Date: Feb. 23, 2005

(87) PCT Pub. No.: WO03/002262

PCT Pub. Date: Jan. 9, 2003

(65) Prior Publication Data

US 2007/0180995 A1     Aug. 9, 2007

(30) Foreign Application Priority Data

Jun. 28, 2001 (NO) .................................. 20013251

(51) Int. Cl.
*B03C 3/014* (2006.01)
(52) U.S. Cl. ................ 96/27; 95/64; 95/71; 96/44; 96/53
(58) Field of Classification Search ............ 96/27, 96/52, 53, 63, 44, 45, 47; 95/64, 65, 71, 95/78
See application file for complete search history.

(56) References Cited

U.S. PATENT DOCUMENTS

| | | | |
|---|---|---|---|
| 2,207,576 A | | 7/1940 | Brown |
| 3,503,704 A | * | 3/1970 | Marks .................. 423/212 |
| 3,958,959 A | | 5/1976 | Cohen |
| 3,988,128 A | * | 10/1976 | Hogg .................. 95/64 |
| 4,095,962 A | * | 6/1978 | Richards .............. 95/65 |
| 4,204,844 A | | 5/1980 | Pilat |
| 4,624,763 A | * | 11/1986 | Chimenti .............. 204/562 |

(Continued)

FOREIGN PATENT DOCUMENTS

CA    2338642    2/2000

(Continued)

OTHER PUBLICATIONS

Pluss examination report from New Zealand Dec. 9, 2004.

*Primary Examiner*—Richard L Chiesa
(74) *Attorney, Agent, or Firm*—Christian D. Abel

(57) ABSTRACT

The device according to the invention includes a drip chamber, which is adapted for connecting to the ordinary water mains, a metal plate and a nozzle that is connected to the drip chamber and disposed above the metal plate and a collecting vessel. The object of the drip chamber is to convert the continuous flow of water from the water mains into discrete drops, thus forming a water reservoir in the bottom of the drip chamber, which is electrically insulated from the water supply while the reservoir still receives a constant new supply of water. Water from the reservoir is passed on to the nozzle and sprayed over the steel plate. An impressed voltage on the nozzle and thereby the water attracts the impurities in the air and these will bind to the water and follow it when the water runs down into a collecting vessel, which is subsequently emptied into the house's drainage system.

1 Claim, 3 Drawing Sheets

U.S. PATENT DOCUMENTS

| | | | |
|---|---|---|---|
| 4,624,765 A * | 11/1986 | Cerkanowicz et al. | 204/563 |
| 6,126,722 A * | 10/2000 | Mitchell et al. | 95/57 |
| 6,156,098 A * | 12/2000 | Richards | 95/65 |
| 6,471,753 B1 * | 10/2002 | Ahn et al. | 96/27 |

FOREIGN PATENT DOCUMENTS

| | | | |
|---|---|---|---|
| DE | 24 44 696 | 3/1976 | |
| EP | 0 424 335 | 4/1991 | |
| HU | 200707 | 6/1988 | |
| HU | 200707 | 8/1990 | |
| JP | 54-114874 A * | 9/1979 | 95/71 |
| JP | 11314048 | 11/1999 | |

* cited by examiner

AIR PURIFICATION DEVICE

This application is the national stage of International Application No. PCT/NO02/00237, filed on Jun. 27, 2002.

The invention relates to a device for purfication of air, especially for purification of indoor air.

Many indoor environments have serious problems with air quality. Odour and dust and too much or too little humidity result in discomfort and may lead to health problems.

There are several methods of purifying the indoor air, the most common being mechanical filtration of circulating air and ionization of molecules, which are attracted into a voltage field.

EP 424 335 relates to a procedure and a device for the purification of air, flue gases and the like, where the purification is performed in a shaft, duct or a pipe containing electrodes. There is a potential difference between the electrodes and the wall(s) in the shaft/duct/pipe. The electrodes ionize impurity particles in the air/flue gases and these are then attracted to the walls to which they become attached. The walls are cleaned of impurities by flushing them with water at regular intervals.

The disadvantage of devices of this type is that they employ extremely high voltage in order to ionize particles or molecules, thereby involving a high voltage source in the device, which may constitute a potential risk in case of contact.

Another disadvantage of existing air purification devices is that the impurities accumulate in the devices and have to be removed manually when the amount of accumulated impurities has become too great.

The object of the invention is to provide a device for purification of indoor air, which is effective for several types of impurities, which does not involve any risk and where the impurities are finally removed from the environment that has to be purified.

The object of the invention is achieved by means of the features in the patent claims.

The device according to the invention comprises a drip chamber, which is adapted for connection to the ordinary water mains, a metal plate, a nozzle that is connected to the drip chamber and disposed above the metal plate and a collecting vessel. The object of the drip chamber is to convert the continuous flow of water from the mains to discrete drops, thus forming a water reservoir in the bottom of the drip chamber, which is electrically insulated from the water supply while the reservoir still receives a constant new supply of water. The water from the reservoir is passed on to the nozzle and sprayed over the steel plate. An impressed voltage on the nozzle, and thereby the water, attracts the impurities in the air and these will then bind to the water and follow the water when it runs down into a collecting vessel, which is subsequently emptied into the house's drainage system.

In a preferred embodiment the device may also be equipped with a device, which comprises a metallic cylinder and a fan. The fan is disposed at one end of the cylinder, while the other end of the cylinder is closed. The fan blows air into the cylinder, thus producing an overpressure in the cylinder. Use is preferably made of a centrifugal fan, which requires a certain amount of air circulation in order to function. In this case the cylinder will therefore be equipped with a hole at the opposite end. Impurities will become attached to the outside of the cylinder.

In a further embodiment the device may also comprise current conducting coils, which are wound around it. The coils are wound in such a manner that the electric fields generated round these coils when current passes through them form a common electric field. The device's other units are placed in the centre of this field.

The invention will now be described in greater detail by means of an example, with reference to the accompanying drawings, in which.

Figure 1:
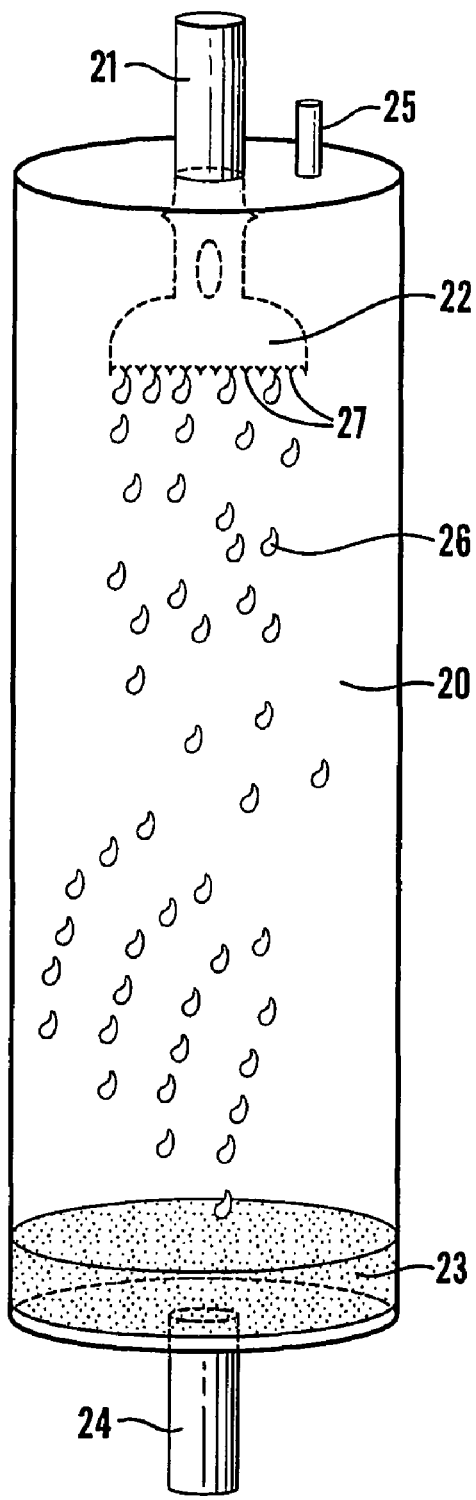
FIG. 1 illustrates the drip chamber.

The device comprises a supply pipe 21 for connecting to the water mains. Water from the ordinary mains will thereby flow into the drip chamber 20. The device further comprises a spreader 22, which is connected in the drip chamber 20 and which converts the continuous flow of water into discrete drops 26, which drip down into the bottom of the drip chamber 20. The spreader 22 works by the water running down an umbrella-like unit where the outer edge of the "umbrella" has a row of points 27. The flow of water is small enough to permit the water to be passed towards the points 27 and drip off them. The bottom of the drip chamber is designed in such a manner that the water is collected and forms a water reservoir 23. The water in the water reservoir 23 is therefore electrically insulated from the water in the supply pipe 21. The drip chamber is airtight, thus causing a small overpressure to build up there when the water flows in through the supply pipe 21 and the spreader 22. The drip chamber 20 also comprises an overpressure valve 25. The water from the water reservoir then continues through the drainpipe 24 into a nozzle 30 in FIG. 2. The nozzle 30 delivers a spray of water on to a metal plate 31, with the result that the area round the nozzle and the adjacent area of the metal plate are surrounded by a mist-like cloud of water. The metal in the plate 31 is preferably stainless steel or another non-corrosive metal. The nozzle 30 and/or the metal plate 31 are provided with electrical connections 33 for impressing a voltage. The water, which is thereby also under voltage, will attract electrically charged molecules/particles and hold on to them. The metal plate 31 is tilted, with the result that the water runs over the plate and down into a collecting vessel, which is not illustrated. The collecting vessel has an emptying function with a level switch, thus causing the water to be emptied out when a certain amount of water has collected.

Figure 3:
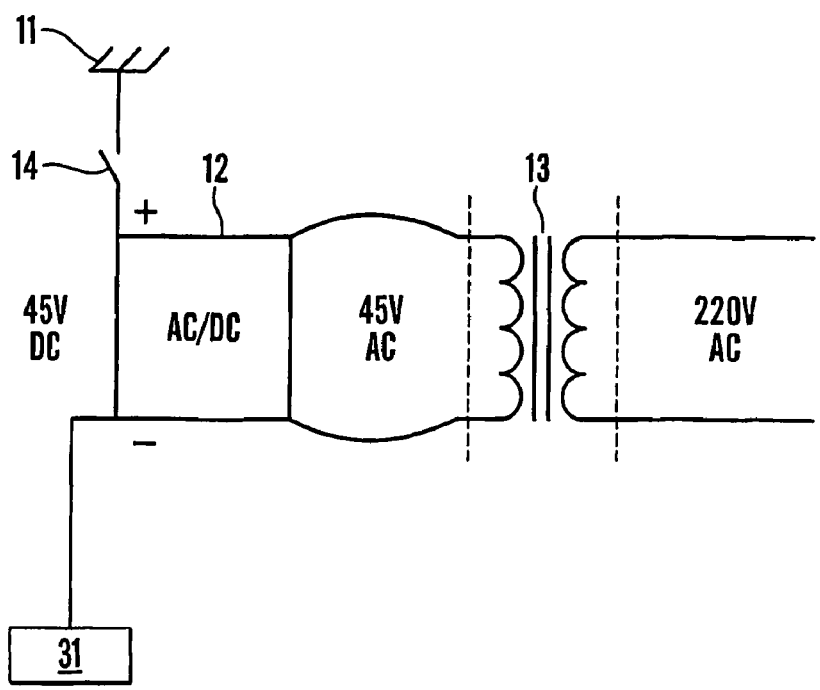
FIG. 3 illustrates the electrical connections for a metal plate in the device according to the invention.

FIG. 3 illustrates how the metal plate 31 or nozzle 30 is electrically insulated from the environment, but electrically connected to a rectifying bridge 12. The rectifying bridge 12 is electrically connected to a transformer 13 for steppingdown an alternating voltage of 220V from the ordinary power grid to an alternating voltage of 45V. The rectifying bridge is earthed via a switch 14 (to the chassis). With this configuration the potential difference between the metal plate 31 and earth 11 can be altered by connecting and disconnecting the switch.

Figure 4:
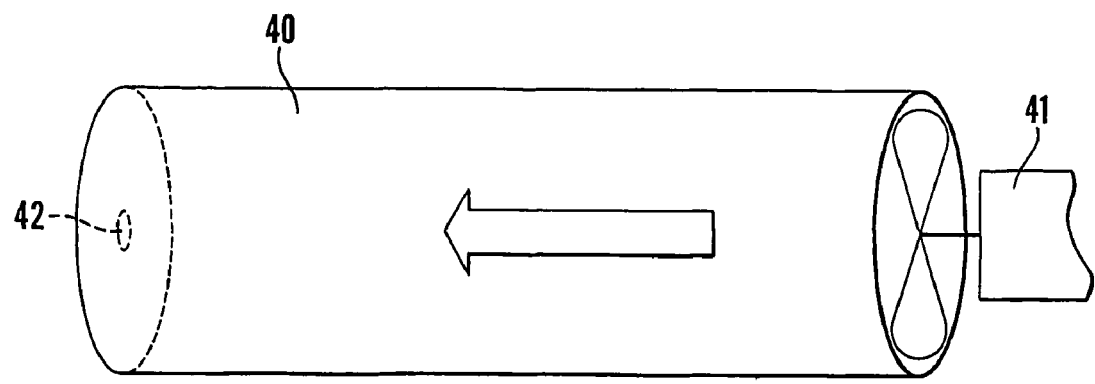
FIG. 4 illustrates a metallic cylinder with a fan that creates overpressure in the cylinder.

In an alternative embodiment in FIG. 4, the device also comprises a metallic cylinder 40, which has a fan 41, preferably a centrifugal fan, at one end and a restriction 42, which restricts the airflow, at the other end. Other types of fans may also be used, e.g. a type that does not require air circulation, in which case the opposite end of the pipe may be completely closed. The cylinder will attract molecules, thereby increasing the efficiency of the device according to the invention.

Figure 2:
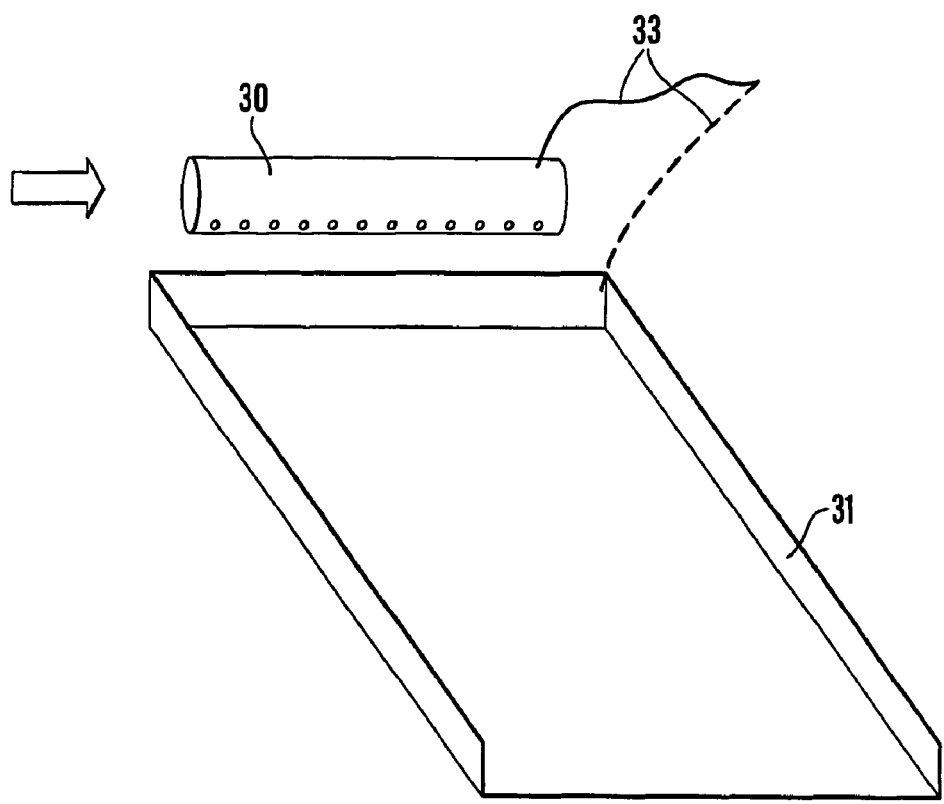
FIG. 2 illustrates the metal plate and nozzle.
Figure 5:
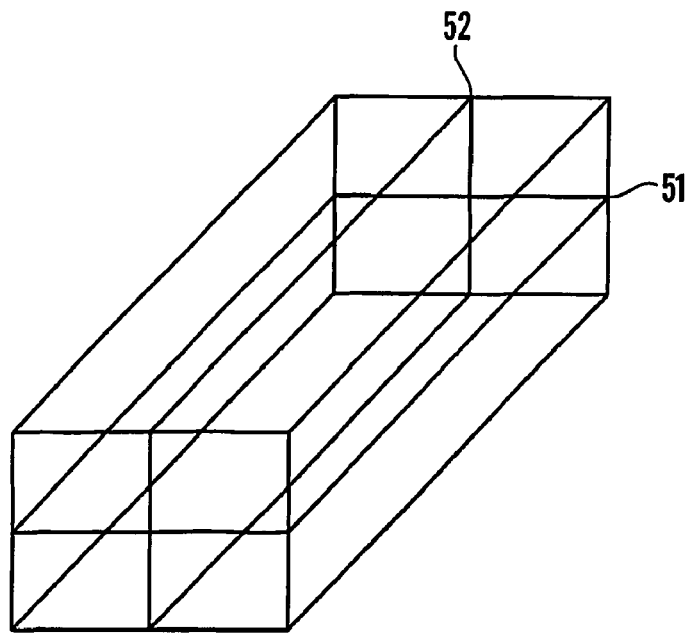
FIG. 5 illustrates a preferred orientation of current conducting coils.

In yet another embodiment the device according to the invention may comprise coils 51 and 52 in FIG. 5, wound by electrical conductors and connected in series to the heating element 20 in FIG. 2. The electric fields generated round the coils create a total electric field. The coils are preferably wound round the apparatus in such a manner that the location of the centre in this total electric field coincides with the location of the other units of the apparatus.

In another alternative embodiment the device may comprise an air humidifier of a known per se type for increasing the humidity of the air surrounding the apparatus.

We claim:

1. A device for purification of air, comprising
   a drip chamber adapted for connecting to a water supply,
   a nozzle connected to the drip chamber,
   a metal plate for receiving the water from the nozzle and passing it on,
   electrical connections connected to the nozzle and/or the metal plate in order to impress a voltage on the nozzle or metal plate and thereby the water that runs through the nozzle or on the metal plate,
   a collecting vessel for collecting the water from the metal plate, said vessel being equipped with a level switch, which controls the emptying of the collecting vessel
   a supply pipe for water,
   a spreader for converting a continuous flow of water from the supply pipe to discrete drops, and
   a water reservoir, which is electrically insulated from the supply pipe.

* * * * *